US012037919B2

(12) United States Patent
Jörgensson et al.

(10) Patent No.: US 12,037,919 B2
(45) Date of Patent: Jul. 16, 2024

(54) ROTOR ASSEMBLY FOR A GAS TURBINE

(71) Applicant: Siemens Energy Global GmbH & Co. KG, Bayern (DE)

(72) Inventors: Otto Jörgensson, Norrköping (SE); Saeid Kharazmi, Norrköping (SE); Johan Kling, Finspong (SE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 0 days.

(21) Appl. No.: 18/024,227

(22) PCT Filed: Aug. 31, 2021

(86) PCT No.: PCT/EP2021/074001
§ 371 (c)(1),
(2) Date: Mar. 1, 2023

(87) PCT Pub. No.: WO2022/049064
PCT Pub. Date: Mar. 10, 2022

(65) Prior Publication Data
US 2024/0026789 A1 Jan. 25, 2024

(30) Foreign Application Priority Data
Sep. 3, 2020 (EP) .................................... 20194391

(51) Int. Cl.
*F01D 5/06* (2006.01)
*F01D 5/08* (2006.01)

(52) U.S. Cl.
CPC ............. *F01D 5/066* (2013.01); *F01D 5/081* (2013.01); *F01D 5/087* (2013.01); *F05D 2220/32* (2013.01)

(58) Field of Classification Search
CPC .......... F01D 5/066; F01D 5/081; F01D 5/087; F05D 2220/32
See application file for complete search history.

(56) References Cited

U.S. PATENT DOCUMENTS 3,070,348 A * 12/1962 Vogel ...................... F01D 5/066 416/198 A
3,443,790 A 5/1969 Buckland
(Continued)

FOREIGN PATENT DOCUMENTS

EP 2118446 A1 11/2009
WO 2014186016 A2 11/2014

OTHER PUBLICATIONS

PCT International Search Report and Written Opinion of International Searching Authority mailed Mar. 10, 2022 corresponding to PCT International Application No. PCT/EP2021/074001 filed Aug. 31, 2021.

*Primary Examiner* — Aaron R Eastman
(74) *Attorney, Agent, or Firm* — Wolter Van Dyke Davis, PLLC

(57) ABSTRACT

A rotor assembly, especially for a gas turbine, includes at least a first rotor disc and a second rotor disc, the two rotor discs are arranged directly next to each other. The first rotor disc has a center through hole and the second rotor disc has no center through hole but a rotor disc center. A flow restrictor assembly which restricts the effective flow cross section of the center through hole of the first disc is used to control or to adjust the cooling air through gaps of a form-fitting torque transmitting device.

11 Claims, 3 Drawing Sheets

(56) References Cited

U.S. PATENT DOCUMENTS

| | | | | | |
|---|---|---|---|---|---|
| 3,680,979 | A * | 8/1972 | Hansen | F01D 5/066 | 416/198 A |
| 3,916,495 | A * | 11/1975 | Klassen | G01M 1/32 | 29/888.011 |
| 5,080,556 | A | 1/1992 | Carreno | | |
| 6,094,905 | A * | 8/2000 | Fukuyama | F01D 5/06 | 415/115 |
| 10,570,758 | B1 * | 2/2020 | Wall | F02K 3/06 | |
| 2010/0143149 | A1 | 6/2010 | Benkler | | |
| 2013/0034402 | A1 * | 2/2013 | Ferslew | F16B 39/12 | 411/107 |
| 2015/0198044 | A1 * | 7/2015 | Jung | F01D 5/10 | 416/96 R |
| 2018/0010461 | A1 * | 1/2018 | Kim | F01D 5/081 | |
| 2019/0063229 | A1 * | 2/2019 | Garner | F01D 5/3007 | |
| 2019/0063259 | A1 * | 2/2019 | Garner | F01D 25/12 | |
| 2020/0325940 | A1 * | 10/2020 | Hartnagel | F01D 5/026 | |

* cited by examiner

ROTOR ASSEMBLY FOR A GAS TURBINE

CROSS REFERENCE TO RELATED APPLICATIONS

This application is the US National Stage of International Application No. PCT/EP2021/074001 filed 31 Aug. 2021, and claims the benefit thereof. The International Application claims the benefit of European Application No. EP20194391 filed 3 Sep. 2020. All of the applications are incorporated by reference herein in their entirety.

FIELD OF THE INVENTION

The invention relates to a rotor assembly for a gas turbine, comprising at least a first rotor disc and a second rotor disc, said two rotor discs are arranged directly next to each other, wherein the first rotor disc comprises a center through hole and the second rotor disc does not comprise a center through hole.

BACKGROUND TO THE INVENTION

In conventional gas turbine it is know that cooling air is guided through the interior of the gas turbine rotor from an inlet located in a compressor section to an outlet located in a turbine section. The cooling air is feed into the turbine section for either or both cooling of turbine rotor blades and/or purging of gaps thus prohibiting hot gas ingestion. Such a gas turbine rotor assembly comprises multiple compressor discs and turbine discs that are bolted together by a central tie bolt is disclosed in EP 2 118 446 A1.

For transmitting torque from rotor disc to rotor disc the contact surfaces of directly adjacent rotor discs are equipped with appropriate features like a Hirth-Serration, a curvic coupling or the like. These form-fitting means often comprises gaps, through which cooling air is guided from the interior of the rotor radially outwardly. Said cooling air gap flow is then used to cool remaining turbine parts, like turbine blades, or as blocking air to avoid hot gas ingestions.

However, the controlling of airflow through said gaps of the form-fitting torque transmitting means, e.g., through a curvic coupling joint located between two adjacent turbine rotor discs, is complex, especially when instead of a single central tie bolt multiple decentralized tie bolts for clamping all rotor discs are used, and more specifically, when they are located on the same pitch circle diameter as the curvic coupling.

Hence, a rotor assembly is needed that allows the controlling or adjustment of the airflow through gaps of form-fitting torque transmitting means of rotor discs.

It is an objective of the invention to provide an advantageous rotor assembly that influences the airflow through gaps of a form-fitting torque transmitting means of two adjacent rotor discs.

SUMMARY OF THE INVENTION

The problem is solved with a rotor assembly according to the features of the independent claim. Advantageously embodiments are subject of dependent subclaims and of the following description. Their individual features can be combined arbitrarily, if not otherwise stipulated.

In detail, the problem is solved by a rotor assembly for a gas turbine, comprising at least a first rotor disc and a second rotor disc, the two rotor discs are arranged directly next to each other, wherein the first rotor disc comprises a center through hole and the second rotor disc does not comprises a center through hole, wherein the second rotor disc comprises a flow restrictor assembly, said flow restrictor assembly restricts the effective flow cross section of the center through hole of the first disc.

In other words: with the aid of a flow restrictor assembly which is attached to the solid center of the second rotor disc, or which is monolithic part of the solid center of the second rotor disc, and which extends into or towards the center through hole of the first disc in such a way, that the effective flow cross section of the center bore is reduced. This throttling of the effective flow cross section reduces the cooling air flow through the center through hole in such a way, that the pressure of the cooling air being next to the first rotor disc is increased significantly, compared to an arrangement having no flow restrictor assembly.

The inventor recognizes that the adjustment of the cooling air flow through said gaps can be achieved easily by applying a flow adapting mechanism at a position along the cooling air flow path, which is located further upstream than the position of the gaps. With this single flow restrictor assembly, the cooling air flow through all gaps are simultaneously influenced, without having a complex sealing or adjustment construction at the position of the gaps.

The increased pressure of cooling air in the region upstream of the first rotor disc leads to an increased cooling air flow through the gaps of the torque transmitting means, that are located on that side of the first rotor disc, that is opposite to that side of the first rotor disc, onto which the second rotor disc is assembled. And, vice versa, the cooling air flow through gaps of torque transmitting means, that are located between the first rotor disc and the second rotor disc, is reduced.

The second rotor disc comprises at its solid center a center blind hole, the center blind hole being located onto that lateral side of the second rotor disc where the first rotor disc is located, wherein the flow restrictor assembly comprises a sleeve that is bolted to the rotor disc center with a bolt being screwed into the center blind hole and a nut. Thus, the sleeve is clamped by a bolt between a nut and the second rotors disc. The outer diameter of the sleeve is slightly smaller than the diameter of the center through hole of the first disc, wherein the difference between those diameters defines the size of the annular ring that acts as the remaining flow area of the throttle which is provided here. By this, the effective flow cross section of the center bore hole is reduced. Another advantage of this modular construction having a releasably attached flow restrictor assembly is the possibility of exchange of sleeves having different outer diameters for established different throttling effects without machining efforts.

In a first particular embodiment of the invention, the flow restrictor assembly extends at least partly into the center through hole of the first rotor disc for restricting the effective flow cross section of the center through hole.

Hence, the flow restrictor assembly does not have to extend through the complete axial length of the center through hole of the first rotor disk. A partial penetrating of the flow restrictor assembly into the center through hole is sufficient. This enables a compact and lightweight design of the rotor assembly.

The previously given description of advantageous embodiments of the invention contains numerous features which are partially combined with one another in the dependent claims. Expediently, these features can also be considered individually and be combined with one another into further suitable combinations. Furthermore, features of the method, formulated as apparatus features, may be considered as features of the assembly and, accordingly, features of the assembly, formulated as process features, may be considered as features of the method.

The above-described characteristics, features and advantages of the invention and the way they are achieved can be understood more clearly in connection with the following description of exemplary embodiments which will be explained with reference to the drawings. The exemplary embodiments are intended to illustrate the invention but are not supposed to restrict the scope of the invention to combinations of features given therein, neither regarding functional features. Furthermore, suitable features of each of the exemplary embodiments can also be explicitly considered in isolation, be removed from one of the exemplary embodiments, be introduced into another of the exemplary embodiments and/or be combined with any of the appended claims.

BRIEF DESCRIPTION OF THE DRAWINGS

The present invention will be described with reference to drawings in which.

DETAILED DESCRIPTION OF THE ILLUSTRATED EMBODIMENTS

Figure 1:
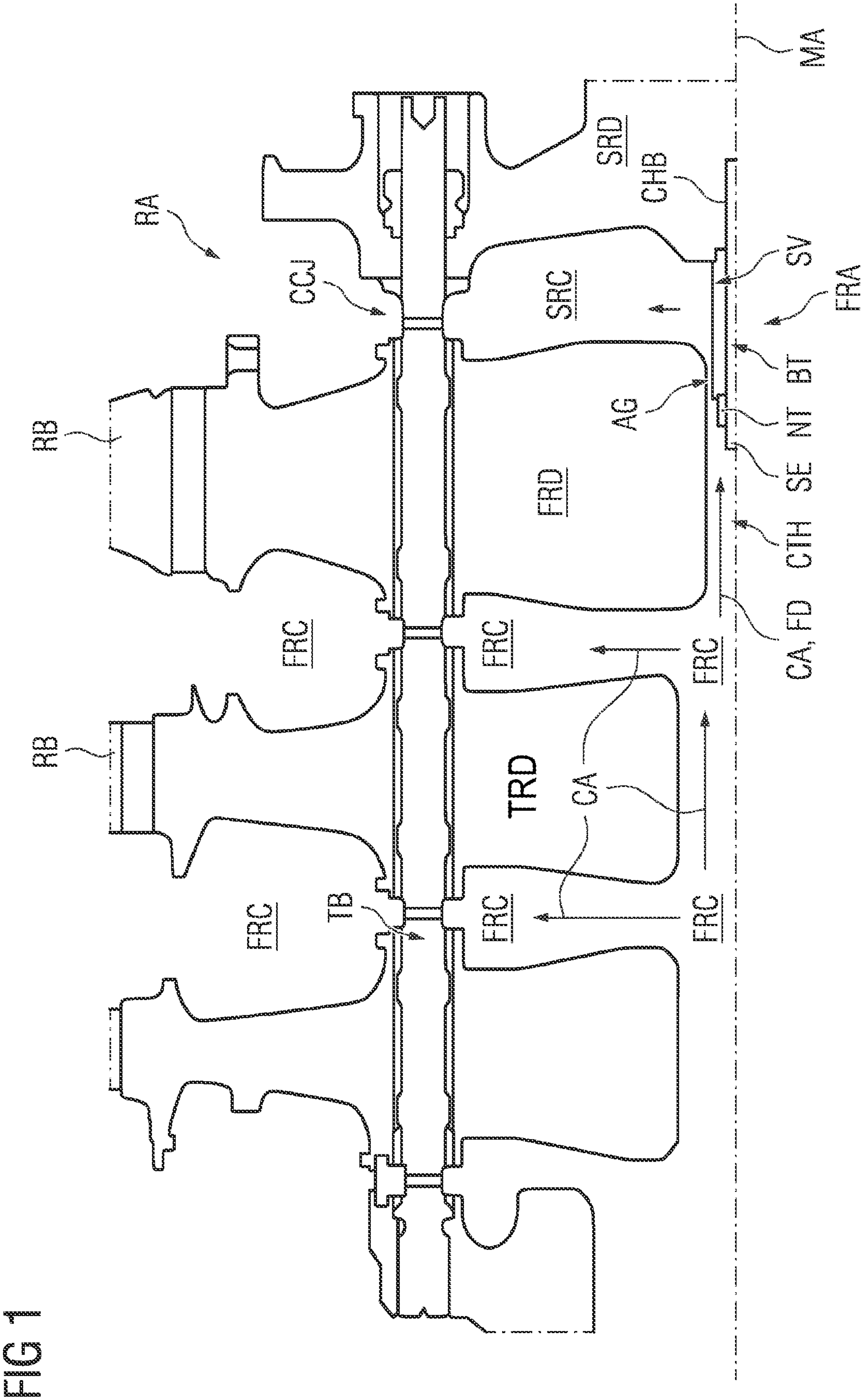
FIG. 1 shows a cross sectional view of a gas turbine rotor comprising at least three rotor discs.
Figure 2:
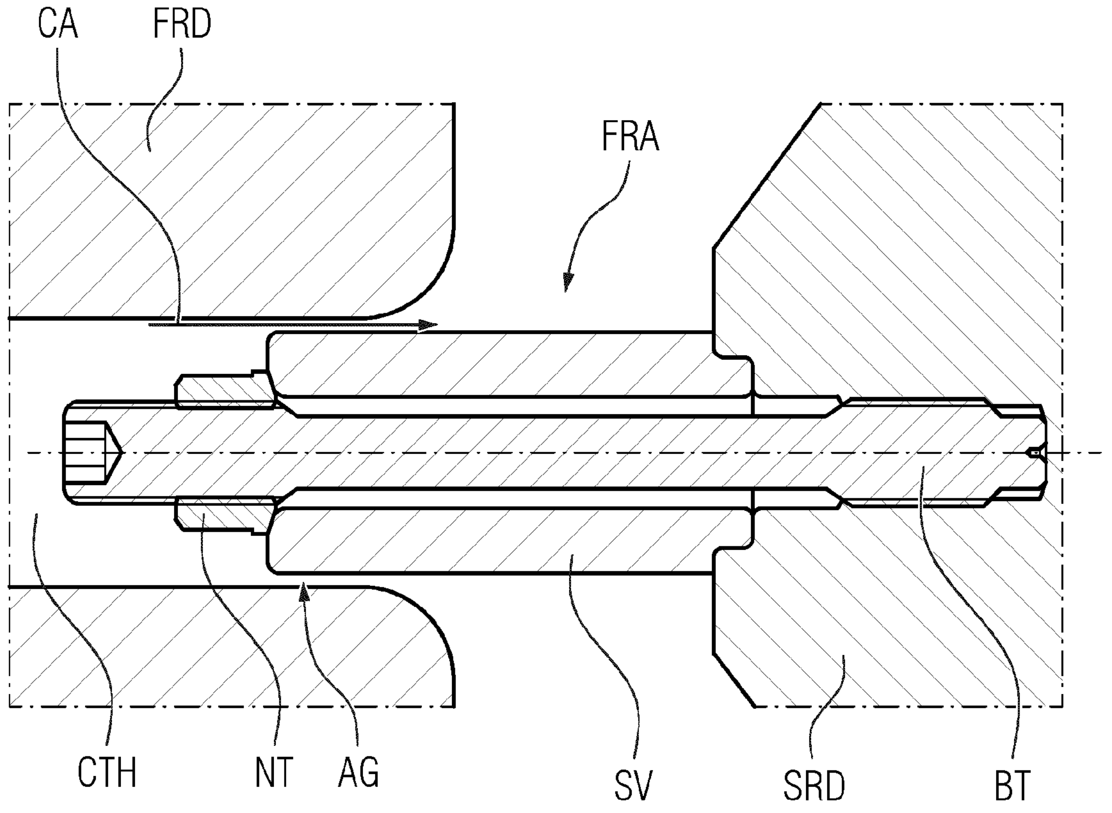
FIG. 2 shows a detail of FIG. 1 comprising the flow restrictor assembly extending into the center through hole of the first rotor disc and FIG. 3 shows an exploded view of the flow restrictions assembly and the second rotor disc and FIG. 4 shows a cross section through the rotor assembly, without showing the first rotor disc.

FIG. 1 shows a rotor assembly RA of a turbine section of a gas turbine. The rotor assembly RA is rotatable about its machine axis MA and comprises at least two discs, a first disc FRD and a second disc SRD. The rotor assembly RA comprises further a third rotor disc TRD, which is located next to the first rotor disc FRD, but opposite of the second rotor disc SRD. The first rotor disc FRD is in between the second rotor disc SRC and the third rotor disc TRD.

The first rotor disc FRD and the third rotor disc TRD each comprises a center through hole CTH whereas the second rotor disc SRD has no center through hole, but only a solid rotor disc center RH with a center blind hole CBH located therein. The center blind hole CBH is located on that lateral side of the second rotor disc SRD, which is next to the first rotor disc FRD. The center through holes CTH are bore holes.

Adjacent rotor discs FRD, SRD, and FRD, TRD are in contact with each other. The contact areas are embodied in this exemplary embodiment as curvic coupling joints CCJ located at a pitch circle diameter, which is determined in reference to the machine axis. On the same pitch diameter each rotor disc FRD, SRD, TRD comprises multiple tie bolt through holes, which are distributed equidistantly along the circumference. Multiple decentralized tie bolts TB extend through aligned tie bolt through holes TBTH for clamping all rotors discs of the rotor assembly RA together.

Between the first rotor disc FRD and the second rotor disc SRD a second rotor cavity SRC is arranged. Similarly, between the first rotor disc FRD and the third rotor disc TRD a first rotor cavity is arranged.

The curvic coupling joints CCJ located between two adjacent turbine rotor discs FRD, SRD, TRD are equipped with gaps distributed along the circumference equidistantly. The gaps enable cooling air to leave the first rotor cavity FRC and the second rotor cavity SRC in radially outwardly direction.

The first rotor disc FRD and the second rotor disc SRD carrying at their outer rims rotor blades RB, which are not shown completely, but only partially.

A flow restrictor assembly FRA is advantageously releasably attached to the second rotor disc SRD. According to this exemplary embodiment of the invention the flow restrictor assembly FRA comprises a sleeve SV that is bolted into the second rotor disc SRD with a bolt BT and a nut NT.

In detail, the second rotor disc SRD comprises a center blind hole CBH with a thread TH, into which the bolt BT is screwed. The sleeve SV encircles the bolt BT and is clamped onto the second rotor disc SRD by the nut, which is screwed onto the free end SE of the bolt BT.

The design and the size of the flow restrictor assembly FRA is selected such, that an annular gap AG of rather smaller size remains between a) the sleeve and b1) either the inner surface of the center through hole CTH of the first rotor disc or b2) the outlet opening of the center through hole CTH. Hence, the effective flow cross section through for the cooling air flow through the center through hole CTH is restricted, i.e., throttled.

During operation, cooling air CA is extracted from the compressor (not shown) and fed into the rotor assembly RA into the first rotor cavities FRC. Through the usage of the flow restrictor assembly FRA, the effective flow cross section of the center through hole CTH of the first rotor disc FRD is restricted, i.e., the amount of cooling air CA which can flow through the center through hole CTH of the first rotor disc is limited hereby. Thus, upstream—with regard to the axial cooling air CA flow direction FD—of the flow restrictor assembly, i.e., in the first rotor cavities FRC, a sufficiently large cooling air pressure can be maintained. This means that a higher cooling air pressure is obtained through the existence of the flow restrictor assembly FRA, compared to a rotor assembly having no flow restrictor assembly. This contributes to the achievement of the required cooling air pressure in the first rotor cavities, so that the rotor blades RB are supplied with the predetermined cooling air amount. The remaining amount of cooling air CA entering a second rotor cavity SRC, which is downstream of the flow restrictor assembly FRA with regard to the cooling flow direction, is reduced by the throttling effect of the flow restrictor assembly FRA.

This creates a controlled, i.e., adjusted flow cross section adapting the amount of air going through the center though hole CTH, independently, if the gap through which the cooling air exists the inner cavities FRC, SRC of the rotor, are arranged—in view of the cooling airflow direction—upstream or downstream of the partially blocked center through hole CTH.

If no restriction or throttle would have been applied, the amount of cooling air to the rotor blades RB would be significantly lower because the exit pressure at the more downstream curvic coupling joint is lower than in other cavities of the turbine rotor and will consume most of the cooling air.

Hence, to control or adjust the airflow through the gas turbine rotor, the restriction or throttle as described is used to reduce the flow through the most downstream curvic coupling joint by a throttle, which is arranged further upstream thereof.

Since the sleeve SV extends only part way into the center through hole CTH, it will not be affected by the axial expansion and contraction of the rotor discs FRD, SRD generated by different material temperatures. Advantageously, the material in the sleeve SV is the same as in the rotor disc FRD.

Figure 3:
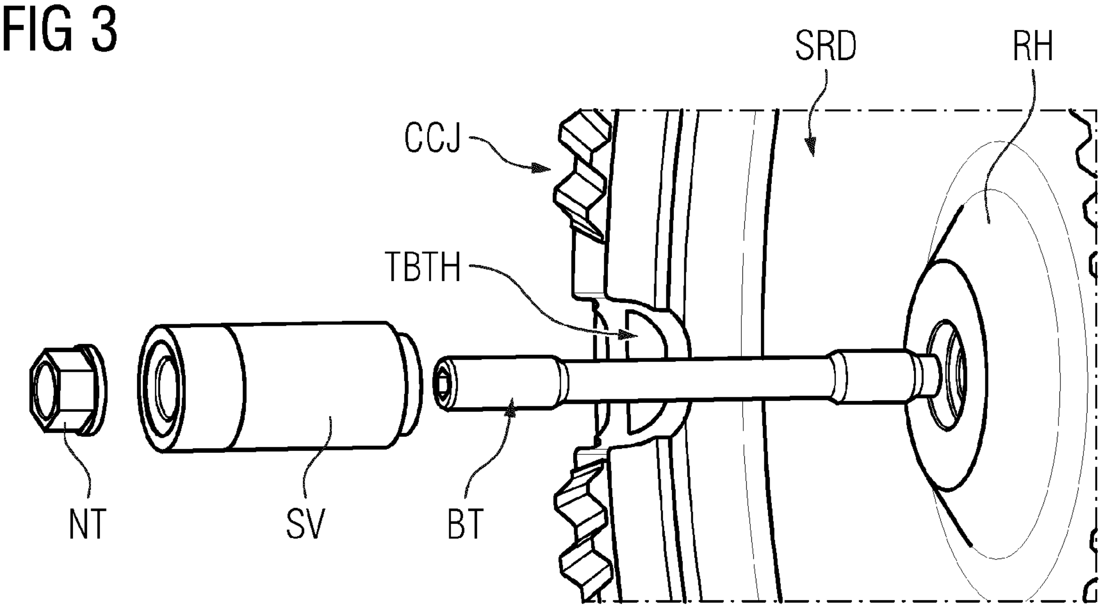
Figure 4:
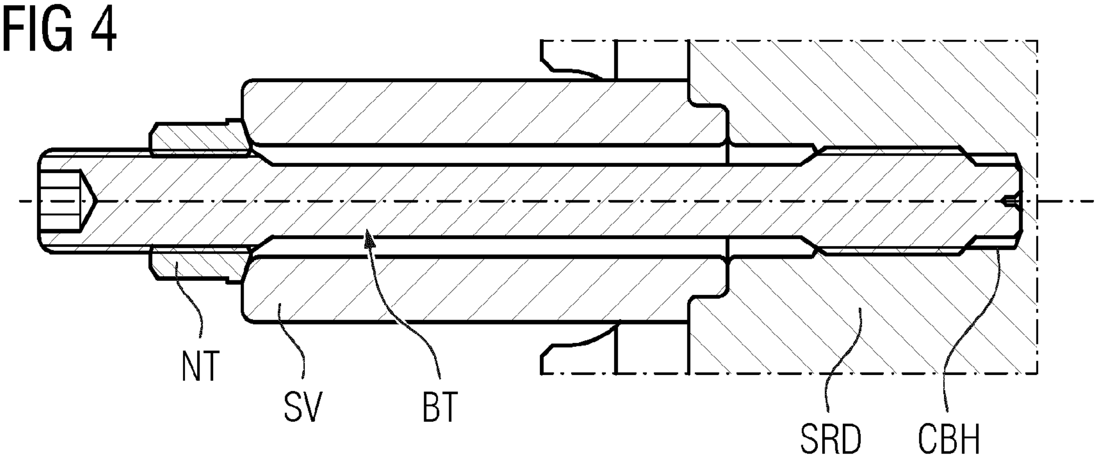

FIG. 3 shows an exploded view of the flow restrictor assembly FRA and the second rotor disc SRD and FIG. 4 shows a cross section through the rotor assembly RA without showing the first rotor disc FRD.

The interface between the nut NT and the sleeve SV is conical to help with the centering of the sleeve SV when assembling it to the second rotor disc SRD. The interface between the sleeve SV and the rotor disc is the top surface of the rotor disc center RH. The part of the sleeve SV that is protruding into the rotor disc center RH enables an easier assembling of the sleeve SV into the rotor disc center RH.

The proposed flow restrictor assembly FRA is a simple solution, comprising only few parts. No additional features are needed on the rotor discs that can potentially lead to an increase in stress on the rotor disc, neither at the first rotor disc FRD nor at the second rotor disc SRD. Since the sleeve SV extends part way into the center through hole CTH of the first rotor disc FRD, it will not affect the axial expansion and contraction of the first rotor disc FRD.

Alternatively, and according to a second exemplary embodiment of the invention, the flow restrictor assembly could also comprise a circular plate (not shown) having a diameter that is larger than the diameter of the center through hole for covering significantly the outlet opening of the center through hole of the first rotor disc for limiting its outlet cross flow area.

According to a third exemplary embodiment of the invention (also not shown) and instead of any of the modular flow restrictor assemblies mentioned above, the flow restrictor assembly could be monolithic and attached as a whole to the second rotor disc.

According to a fourth exemplary embodiment of the invention (again not shown), the modular flow restrictor could be monolithic part of the second rotor disc.

The invention claimed is:

1. A rotor assembly for a gas turbine, comprising:

at least a first rotor disc and a second rotor disc, wherein the first and second rotor discs are arranged directly next to each other, wherein the first rotor disc comprises a center through hole and the second rotor disc comprises a rotor disc center, wherein the second rotor disc comprises a flow restrictor assembly, said flow restrictor assembly restricts an effective flow cross section of the center through hole of the first rotor disc, wherein a rotor hub of the second rotor disc is solid, wherein the second rotor disc comprises a center blind hole at the rotor hub, the center blind hole being located on a lateral side of the second rotor disc where the first rotor disc is located, and wherein the flow restrictor assembly comprises a sleeve that is bolted to the rotor hub with a bolt being screwed into the center blind hole and a nut.

2. The rotor assembly according to claim 1, wherein the flow restrictor assembly extends at least partly into the center through hole of the first rotor disc for restricting the effective flow cross section of the center through hole.

3. The rotor assembly according to claim 1, wherein the flow restrictor assembly is releasably attached to the second rotor disc.

4. A gas turbine, comprising:

a rotor assembly according to claim 1.

5. A rotor assembly for a gas turbine, comprising:

a first rotor disc and a second rotor disc, wherein the first and second rotor discs are arranged directly next to each other, wherein the first rotor disc comprises a center through hole and the second rotor disc comprises a rotor disc center, wherein the second rotor disc comprises a flow restrictor assembly, said flow restrictor assembly restricts an effective flow cross section of the center through hole of the first rotor disc, wherein a rotor hub of the second rotor disc is solid, wherein the second rotor disc comprises a center blind hole at the rotor hub, the center blind hole being located on a lateral side of the second rotor disc where the first rotor disc is located, wherein the flow restrictor assembly comprises a sleeve that is bolted to the rotor hub with a bolt being screwed into the center blind hole and a nut, and wherein an outer surface of the sleeve and the center through hole of the first rotor disc define an annular gap that restricts the effective flow cross section through the center through hole.

6. The rotor assembly according to claim 5, wherein the outer surface of the sleeve and an inner surface of the center through hole define the annular gap.

7. The rotor assembly according to claim 5, wherein the outer surface of the sleeve and an outlet opening of the center through hole define the annular gap.

8. The rotor assembly according to claim 5, wherein the sleeve does not extend beyond the second rotor disc.

9. The rotor assembly according to claim 5, wherein the center blind hole comprises female threads; and wherein the bolt engages the female threads in the center blind hole to bolt the sleeve to the rotor hub.

10. The rotor assembly according to claim 9, wherein the sleeve is clamped by the bolt between the nut and the second rotor disc.

11. The rotor assembly according to claim 10, wherein the bolt extends though a hollow interior of the sleeve.

* * * * *